United States Patent
Bennett

(10) Patent No.: US 12,070,824 B2
(45) Date of Patent: Aug. 27, 2024

(54) SYSTEMS AND METHODS FOR REMOVING FOREIGN OBJECT DEBRIS DURING A MANUFACTURING PROCESS

(71) Applicant: THE BOEING COMPANY, Chicago, IL (US)

(72) Inventor: John W. Bennett, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/872,725

(22) Filed: Jul. 25, 2022

(65) Prior Publication Data
US 2023/0405748 A1    Dec. 21, 2023

Related U.S. Application Data

(60) Provisional application No. 63/344,092, filed on May 20, 2022.

(51) Int. Cl.
*B23Q 11/00* (2006.01)
*B08B 5/02* (2006.01)

(52) U.S. Cl.
CPC .............. *B23Q 11/005* (2013.01); *B08B 5/02* (2013.01)

(58) Field of Classification Search
None
See application file for complete search history.

(56) References Cited

U.S. PATENT DOCUMENTS 10,875,138 B1 *   12/2020   Mann ................. B23Q 11/1015
2013/0056025 A1 *  3/2013   Widhalm ................ B29C 65/08
                                                              134/6

FOREIGN PATENT DOCUMENTS

CN           108889937 A  * 11/2018  ............ B22F 1/0003
WO     WO-2006082258 A1  *  8/2006  ............. B01J 3/067

OTHER PUBLICATIONS

Translation of WO2006082258A1 (Year: 2023).*
Translation of CN108889937 (Year: 2023).*

* cited by examiner

*Primary Examiner* — Eric W Golightly
(74) *Attorney, Agent, or Firm* — Joseph M. Butscher; The Small Patent Law Group LLC

(57) ABSTRACT

A system and a method include a tool having an operative portion. The tool is disposed in relation to a first side of one or more components. An anvil is disposed in relation to a second side of the one or more components. The second side is opposite from the first side. The anvil includes a first portion separated from a second portion by a gap. A fluid circuit includes a fluid stream that extends through the gap. The fluid circuit is configured to remove foreign object debris generated in relation to the second side of the one or more components.

26 Claims, 12 Drawing Sheets

SYSTEMS AND METHODS FOR REMOVING FOREIGN OBJECT DEBRIS DURING A MANUFACTURING PROCESS

RELATED APPLICATIONS

This application relates to and claims priority benefits from U.S. Provisional Patent Application No. 63/344,092, entitled "Systems and Methods for Removing Foreign Object Debris During a Manufacturing Process," filed May 20, 2022, which is hereby incorporated by reference in its entirety.

FIELD OF THE DISCLOSURE

Examples of the present disclosure generally relate to systems and methods for removing foreign object debris from components, such as a portion of a vehicle, during a manufacturing process.

BACKGROUND OF THE DISCLOSURE

During a manufacturing process, various components are operated on by tools. For example, drills are operated on panels, stringers, skins, and the like of a wing during a manufacturing process. As tools operate on components, foreign object debris may be generated. For example, as a drill bit passes through a panel, small pieces of the panel can be generated.

Drilling and cutting through components typically generates foreign object debris. Often, multiple components are clamped together during such operations. Foreign object debris is evacuated by cutter flutes that pull chips out of a formed hole of a component(s) on one side of the component(s) (for example, the side of the component that a drill bit enters). However, as a drill bit breaks through the component(s), some chips can pass through the hole on an opposite side of the component(s) (for example, a non-drilled side of the component). When drilling certain aluminum components, one or more chips can also form on a tip of the drill bit and become foreign object debris. Also, some applications utilize a machine to drill out a temporary tack fastener. As the drill feeds into the hole, the tail of the tack fastener is typically pushed out the back of the component(s), and also becomes foreign object debris.

FIG. 1 illustrates a perspective top view of an assembly line 10. The assembly line 10 shown is an example of a panel assembly line for wing panels. The assembly line 10 has a plurality of operative systems (such as drilling systems) that are configured to operate on components, such as wing panel stringers of a commercial aircraft. It has been found that the operating systems may generate foreign object debris at certain positions 12 and 14, for example, or may become lodged in or on a wing panel or component thereof as it moves through the assembly line. The generated foreign object debris may remain at the positions 12 and 14.

In a panel assembly line, the process of cleaning and/or removing foreign object debris may be time and labor intensive. For example, it often takes at least one hour per panel to clean and/or remove the foreign object debris that remains at various areas of the panel assembly line. Also, foreign object debris may cause quality defects, which may require additional time, labor, and/or parts to remedy.

Drilling operations performed on vertically-held panels (such as in relation to a panel assembly for a commercial aircraft) may generate foreign object debris, such as chips formed during drilling operations. Such chips are usually captured on a side (that is, the drilled side of the panel, or the side of the panel assembly closest to a drill) by a chip collection system. However, such a system may be ineffective to collect foreign object debris generated on an opposite side of the panel, as the drill breaks through the surface from the drilled side.

In general, while foreign object debris is typically collected on one side of a component(s) during a manufacturing process, foreign object debris may collect or be deposited in relation to an opposite side of component(s).

SUMMARY OF THE DISCLOSURE

A need exists for an improved system and method for collecting foreign object debris during a manufacturing process. Further, a need exists for an efficient and effective system and method for collecting foreign object debris in relation to a side of one or more components that is opposite from a tool.

With those needs in mind, certain examples of the present disclosure provide a system including a tool having an operative portion. The tool is disposed in relation to a first side of one or more components. An anvil is disposed in relation to a second side of the one or more components. The second side is opposite from the first side. The anvil includes a first portion separated from a second portion by a gap. A fluid circuit includes a fluid stream that extends through or across the gap. The fluid circuit is configured to remove foreign object debris generated in relation to the second side of the one or more components.

In at least one example, the fluid circuit includes one or both of a first fluid conduit in fluid communication with a fluid outlet formed on or within the first portion, or a second fluid conduit in fluid communication with a fluid inlet formed on or within the second portion. At least a portion of the first fluid conduit can be integrally formed within the anvil. At least a portion of the second fluid conduit can be integrally formed within the anvil. In at least one example, the fluid circuit includes both the first fluid conduit and the second fluid conduit.

In at least one example, the system also includes one or both of a pressurized air source in fluid communication with the first fluid conduit, or a vacuum generator in fluid communication with the second fluid conduit.

Examples of the one or more components include one or more of a panel, a stringer, a skin, or a spar. Examples of the tool include a drill, a saw, or a laser device.

The system can also include an additional fluid stream in relation to the first side of the one or more components.

Certain examples of the present disclosure provide a method including removing, by a fluid circuit including a fluid stream that extends through a gap between a first portion and a second portion of an anvil, foreign object debris generated through operation of a tool in relation to one or more components.

Certain examples of the present disclosure provide an anvil configured to be disposed to a side of one or more components opposite from a tool. The anvil incudes a first portion separated from a second portion by a gap, and a fluid circuit including a fluid stream that extends through the gap. The fluid circuit is configured to remove foreign object debris.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide systems and methods for collecting foreign object debris during a manufacturing process. The systems and methods are configured to collect and remove foreign object debris on a side of a component that is opposite from a tool, such as a drill. In at least one example, foreign object debris can be collected from both sides of the component. In at least one example, a system for collecting foreign object debris is integrally formed with a portion of a tooling system, such as within an anvil.

Certain examples of the present disclosure provide systems and methods for collecting foreign object debris generated in aerospace manufacturing through internal cavities within a tool used by equipment to provide clamp force during processing. In at least one example, the systems and methods utilize one or both of pneumatic pressure and vacuum pressure to collect foreign object debris at the point of origin while maintaining the ability to access tight clearance areas within aircraft parts.

In at least one example, a system includes a directed pressure flow and/or a vacuum flow within a tooling system in order to create a stream of moving air that is in fluid communication with a drilling location on the non-drilled side of a vertically held panel. The system is configured to collect foreign object debris generated as a tool (such as a drill) breaks through a surface of the panel. In at least one example, the fluid flow is formed through an anvil, which clamps against the non-drilled side of a panel.

Figure 1:
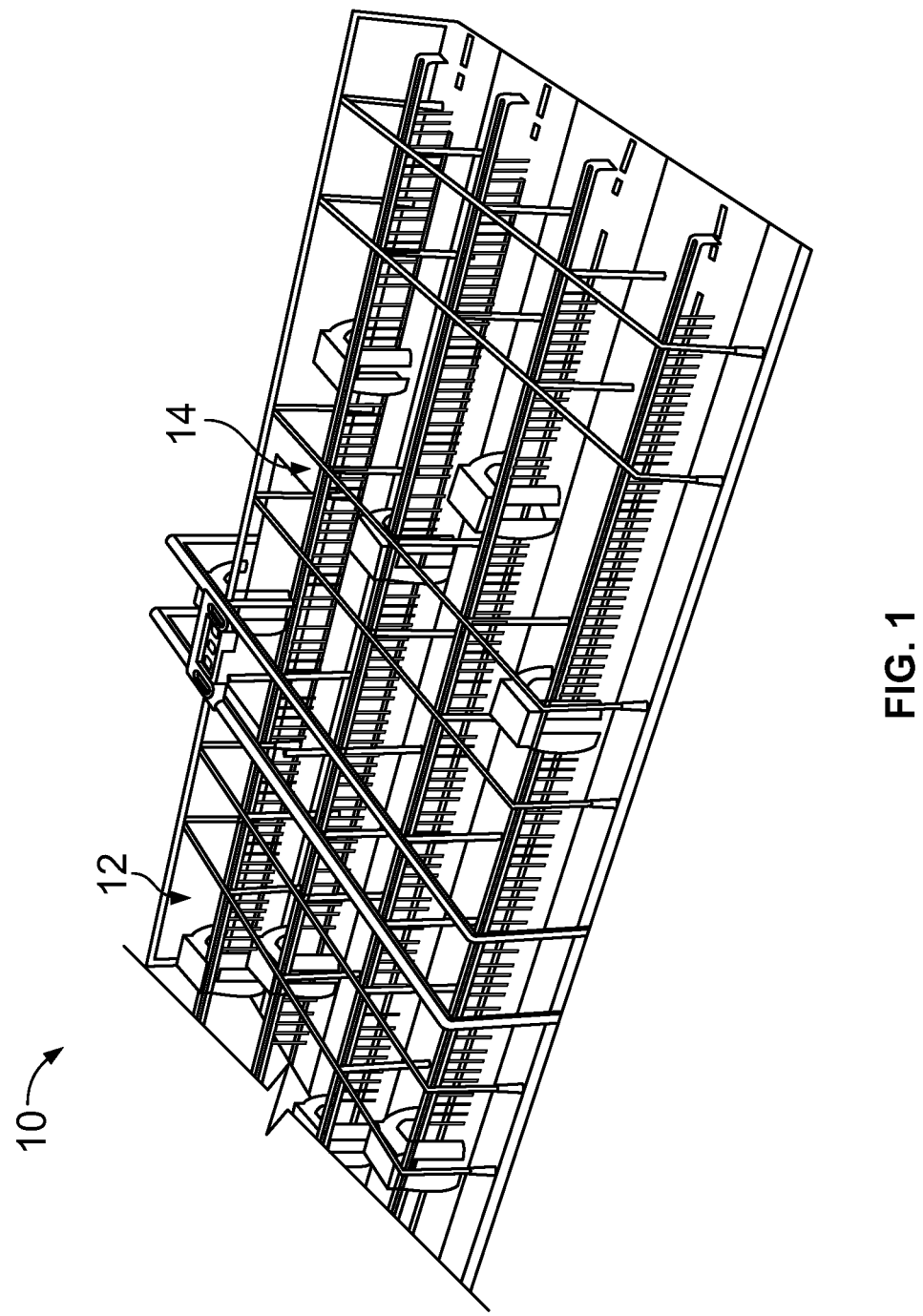
FIG. 1 illustrates a perspective top view of an assembly line.
Figure 2:
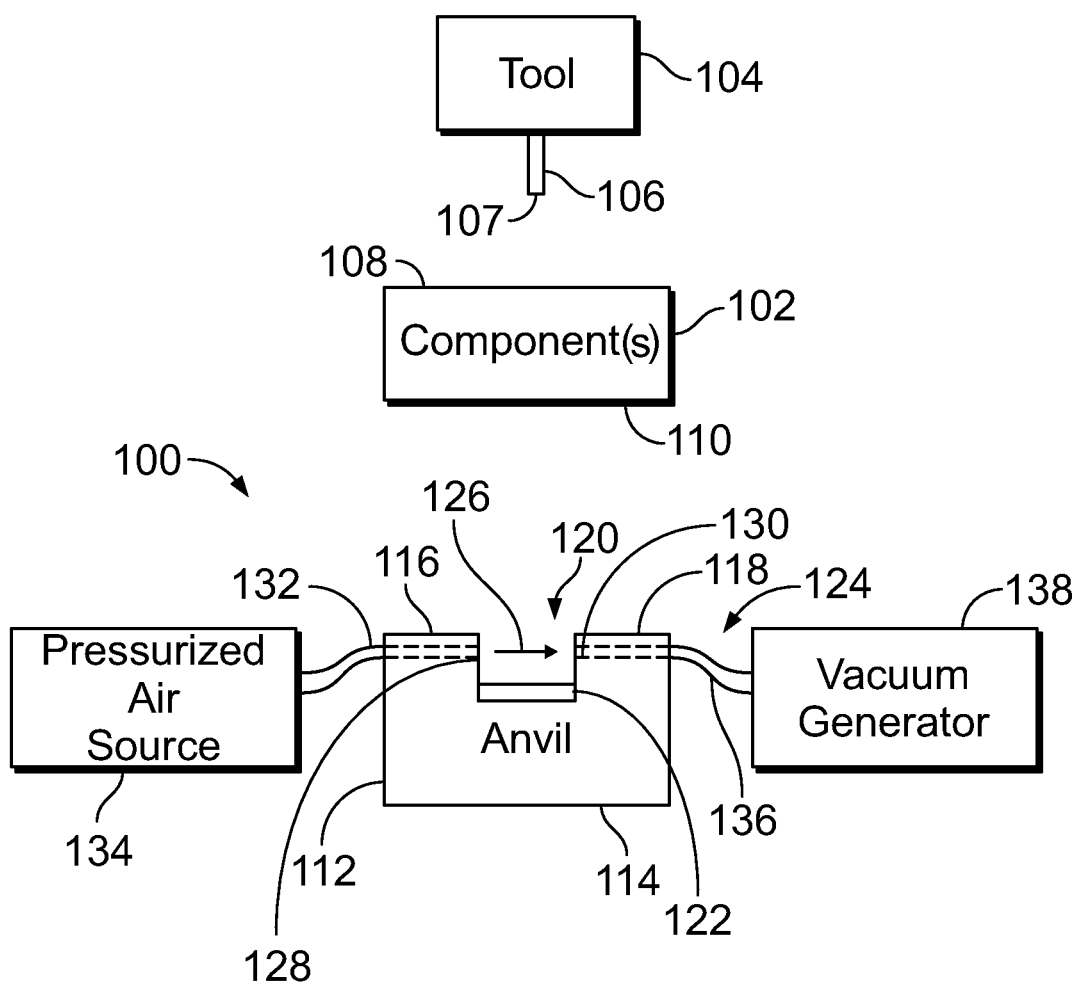
FIG. 2 illustrates a schematic block diagram of a system for removing foreign object debris during a forming operation performed on one or more components by a tool, according to an example of the present disclosure.

FIG. 2 illustrates a schematic block diagram of a system 100 for removing foreign object debris during a forming operation performed on one or more components 102 by a tool 104, according to an example of the present disclosure. The component(s) 102 can include one or more panels, stringers, skins, spars, and/or the like. In at least one example, the tool 104 is configured to operate on two or more components 102 clamped together. For example, the components 102 can include a wing panel stringer clamped to a wing panel skin.

The tool 104 includes an operative portion 106 that is configured to form a feature on and/or within the component(s) 102. For example, the tool 104 can be a drill, and the operative portion 106 can be a drill bit. As another example, the tool 104 can be a saw, and the operative portion 106 can be a blade. As another example, the tool 104 can be a laser device (such as a laser cutting device), and the operative portion 106 can be a laser emission tip.

The tool 104 is disposed in relation to a first side 108 of the component(s) 102. In this manner, the first side 108 can be considered the tool side of the component(s) 102. The component(s) 102 include a second side 110 opposite from the first side 108. An anvil 112 is disposed in relation to the second side 110. As such, the second side 110 can be considered the anvil side of the component(s) 102. As shown, the component(s) 102 is disposed between the tool 104 and the anvil 112.

The anvil 112 is opposite from the tool 104 and is configured to support the component, such as by providing a clamp up during a forming operation. The anvil 112 can also be used to perform other functions, such as forming rivets, swaging collars, measuring part features, and/or the like.

The anvil 112 includes a main body 114. A first portion 116 and a second portion 118 are coupled to the main body 114. The first portion 116 and the second portion 118 are separated by and/or define a gap 120. In at least one example, the first portion 116 is a first fork of the anvil 112, and the second portion 118 is a second fork of the anvil 112. However, it should be understood that an anvil, as defined herein, may assume any of a broad variety of configurations, for example as determined by the configuration, geometry, and/or other aspects of the component(s) undergoing an operation by the tool 104. A base or die 122 can be disposed between the first portion 116 and the second portion 118 and can be moveable within the gap 120. For example, the die 122 can be extended into and retracted within the gap 120. The gap 120 is configured to receive, or otherwise define a clearance for, an end 107 of the operative portion 106 of the tool 104 as it operates on the component(s) 102. For example, the tool 104 is operable such that the operative portion 106 passes into and through the component(s) 102, and can pass into the gap 120.

The system 100 includes a fluid circuit 124 that includes a fluid stream 126 (such as an air stream) that passes through the gap 120. The fluid circuit 124 includes a fluid outlet 128 disposed on and/or within the first portion 116 of the anvil 112, and a fluid inlet 130 formed on and/or within the second portion 118 of the anvil 112. The fluid outlet 128 and the fluid inlet 130 can be coaxially aligned.

In at least one example, the fluid outlet 128 is in fluid communication with a first fluid conduit 132 that extends on and/or within the first portion 116. The first fluid conduit 132 can include one or more ducts, tubes, chutes, integrally formed fluid paths, and/or the like. The first fluid conduit 132 is, in turn, in fluid communication with a pressurized air source 134, such as one or more of a pressurized air cylinder, an air compressor, blower(s), fan(s), and/or the like. As such, the first fluid conduit 132 can be a fluid path that delivers pressurized air from the pressurized air source 134 to and through the fluid outlet 128.

In at least one example, the fluid inlet 130 is in fluid communication with a second fluid conduit 136 that extends on and/or within the first portion 118. The second fluid conduit 136 can include one or more ducts, tubes, chutes, integrally formed fluid paths, and/or or the like. The second fluid conduit 136 is, in turn, in fluid communication with a vacuum generator 138, such as vacuum pump. As such, the second fluid conduit 136 can be a fluid path that draws air from the gap 120 into the fluid inlet 130.

In operation, as the tool 104 operates on the component(s) 102, the operative portion 106 can pass through the first side 108 and the second side 110. As the operative portion 106 passes through the second side 110, foreign object debris can be generated and pass into the gap 120. The fluid stream 126 is generated by operation of the pressurized air source 134 blowing air into the gap 120 through the fluid outlet 128, and the vacuum generator 138 drawing the air into the fluid inlet 130. The fluid stream 126 flows across the gap 120 between the fluid outlet 128 and the fluid inlet 130. The fluid stream 126 draws in foreign object debris generated at and/or through the second side 110 of the component(s). Foreign object debris contained within the fluid stream 126 is drawn into the fluid inlet 130 via the vacuum generator 138, and therefore automatically, effectively, and efficiently collected.

As shown, the system 100 includes the pressurized air source 134 and the vacuum generator 138 to generate the fluid stream 126. In at least one other example, the system 100 can include only one of the pressurized air source 134 or the vacuum generator 138. That is, the fluid stream 126 can be generated by only one of the pressurized air source 134 or the vacuum generator 138. However, generating the fluid stream 126 using both the pressurized air source 134 and the vacuum generator 138 may generate a more highly effective and efficient fluid stream 126 that removes foreign object debris that may be formed in relation to the second side 110 of the component(s) 102, as opposed to an embodiment of the system that includes only a pressurized air source or a vacuum generator.

Additionally, one or both of a pressurized air source and a vacuum generator can be disposed in relation to the first side 108 of the component(s) 102 to generate an additional fluid stream in relation to the first side 108. In this manner, fluid streams configured to remove foreign object debris can be generated on both sides 108 and 110 of the component(s) 102. In at least one example, separate pressurized air sources and/or vacuum generators can be used to generate the different fluid streams. In at least one other example, a single pressurized air source and/or a single vacuum generator can be used to generate the multiple fluid streams, such as via branched ducting, or the like.

As described herein, a system includes the tool 104 having the operative portion. The tool 104 is disposed in relation to the first side 108 of the one or more components 102. The anvil 112 disposed in relation to the second side 110 of the one or more components 102. The second side 110 is opposite from the first side 108. The anvil 112 includes the first portion 116 (such as a first fork) separated from the second portion 118 (such as a second fork) by the gap 120. The fluid circuit 124 includes the fluid stream 126 that extends through the gap 120. The fluid circuit 124 is configured to remove foreign object debris generated in relation to the second side 108 of the one or more components 102. In at least one example, the fluid circuit 124 includes one or both of the first fluid conduit 132 in fluid communication with the fluid outlet 128 formed on or within the first portion 116, and/or the second fluid conduit 136 in fluid communication with the fluid inlet 130 formed on or within the second portion 118. The pressurized air source 134 is in fluid communication with the first fluid conduit 132. The vacuum generator 138 is in fluid communication with the second fluid conduit 136.

The anvil 112 is configured to be disposed to a side of one or more components 108 opposite from the tool 104. The anvil 112 includes the first portion 116 separated from the second portion 118 by the gap 120. The fluid circuit 124 including the fluid stream 126 extends through the gap 120. The fluid circuit 124 is configured to remove foreign object debris. In at least one example, the fluid circuit also includes one or both of the first fluid conduit 132 in fluid communication with the fluid outlet 128 formed on or within the first portion 116, and/or the second fluid conduit 136 in fluid communication with the fluid inlet 130 formed on or within the second portion 118. In at least one example, at least a portion of the first fluid conduit 132 is integrally formed within the anvil 112, and/or at least a portion of the second fluid conduit 136 is integrally formed within the anvil 112.

Figure 3:
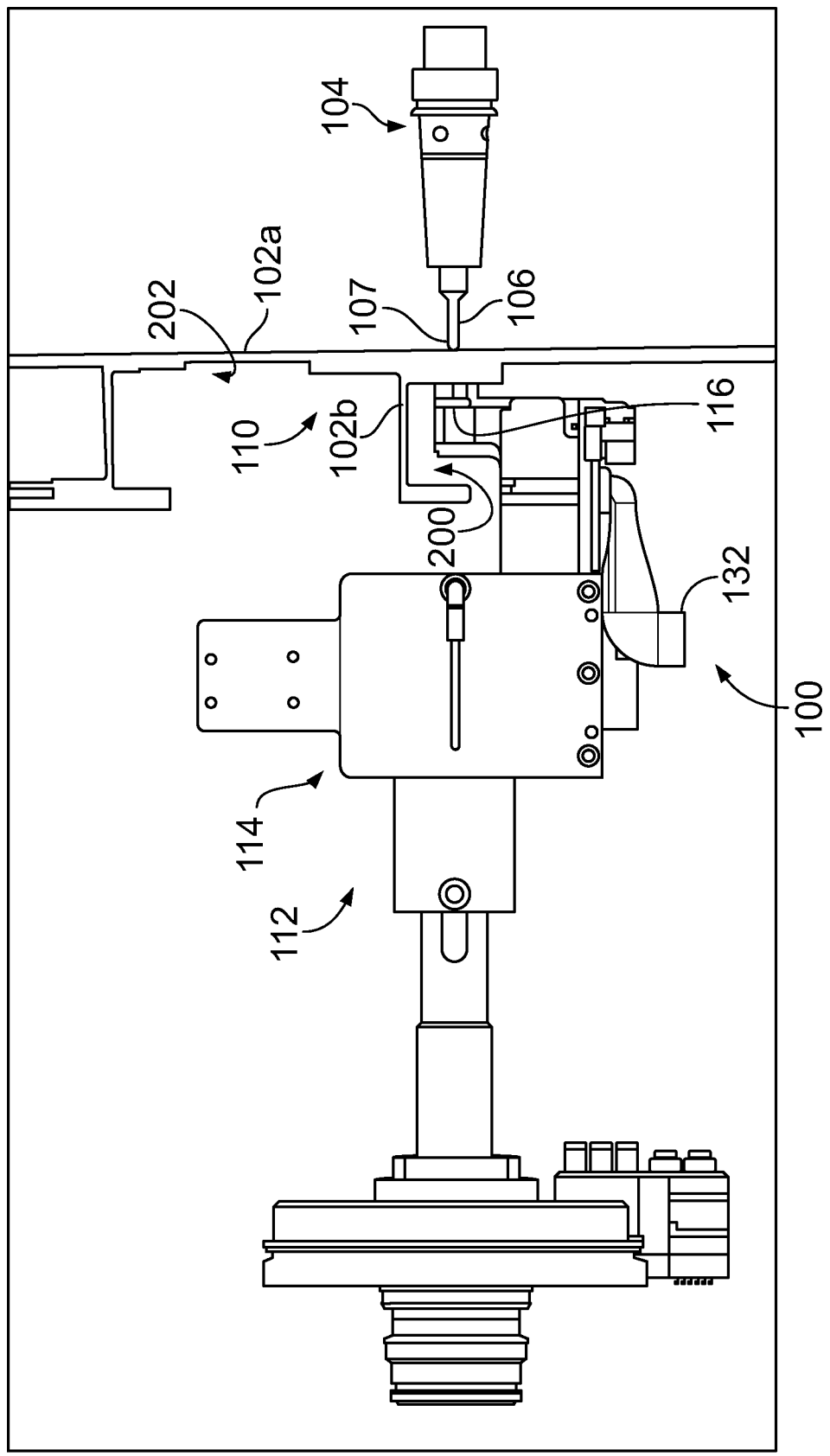
FIG. 3 illustrates a lateral view of a system for removing foreign object debris during a forming operation performed on components by the tool, according to an example of the present disclosure.

FIG. 3 illustrates a lateral view of the system 100 for removing foreign object debris during a forming operation performed on components 102a and 102b by the tool 104, according to an example of the present disclosure. As shown, the component 102a can be a skin, and the component 102b can be a stringer. The components 102a and 102b can be clamped together by a clamping system (not shown in FIG. 3). As shown in FIG. 3, the tool 104 is a drill that is configured to form holes through the components 102a and 102b.

The anvil 112 can be sized and shaped to fit within a channel 200 formed between the components 102a and 102b. For example, the first portion 116 and the second portion 118 (not shown in FIG. 3, but is aligned with the first portion 116) are forks that are configured to fit within the channel 200. The anvil 112 can be sized and shaped to efficiently and effectively cooperate with various different components. The anvil 112 shown in FIG. 3 is merely exemplary. As noted above, the anvil 112 can be sized and shaped differently than shown. A recess 202 may be provided. The recess 202 can be due to the form factor of the component(s), independent of integration of the components together.

Referring to FIGS. 2 and 3, the first fluid conduit 132 and the second fluid conduit 136 can be integrally formed within the anvil 112. The first fluid conduit 132 and the second fluid conduit 136 can include portions that are integrally formed within the anvil 112. For example, the anvil 112 can include internal passages that form portions of the first fluid conduit 132 and/or the second fluid conduit 136. The first fluid conduit 132 and/or the second fluid conduit 136 can also include portions that extend out of the anvil 112. In at least one other example, the first fluid conduit 132 and/or the second fluid conduit 136 can be wholly external from the anvil 112. That is, the first fluid conduit 132 and/or the second fluid conduit 136 may not extend internally within the anvil 112.

With respect to a panel assembly line, anvil design may be constrained by the components (such as wing panels) and the tool(s) 104 that interface with the anvil 112. In such panel assembly lines, it may not be feasible to add an external shroud to enclose the drill break out zone due to the complex and varying part geometry. Further, a vacuum port located away from the drill break out zone may not be effective in collecting chips. Accordingly, examples of the present disclosure, such as shown in FIG. 3, provide the system 100 for collecting foreign object debris at the point of origin, such as within the anvil 112 in relation to the second side 110 of the components 102a and 102b. By integrating the first fluid conduit 132 and the second fluid conduit 136 into the anvil 112, the form factor of the anvil 112 is not significantly impacted.

Figure 4:
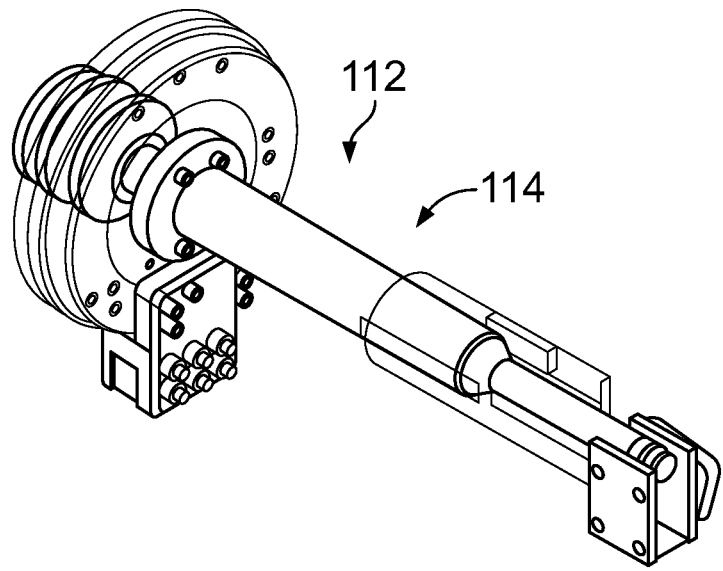
FIG. 4 illustrates a perspective view of an anvil, according to an example of the present disclosure.
Figure 5:
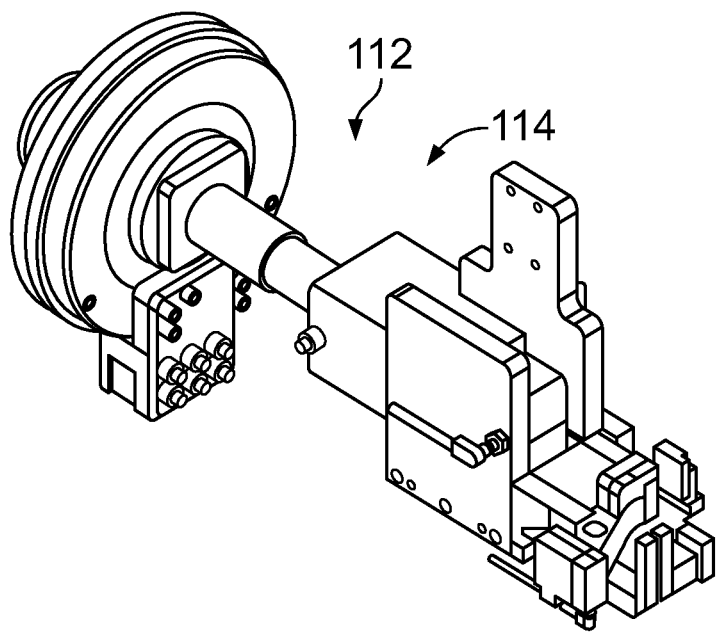
FIG. 5 illustrates a perspective view of an anvil, according to an example of the present disclosure.

FIG. 4 illustrates a perspective view of an anvil 112, according to an example of the present disclosure. As shown in FIG. 4, the anvil 112 is a rivet straight anvil. FIG. 5 illustrates a perspective view of an anvil 112, according to an example of the present disclosure. As shown in FIG. 5, the anvil is a collar offset anvil. The anvils shown in FIGS. 3-5, for example, are merely exemplary. The anvils 114 can be sized and shaped differently than shown. The anvils 114 can also include more or fewer parts than as shown.

Figure 6:
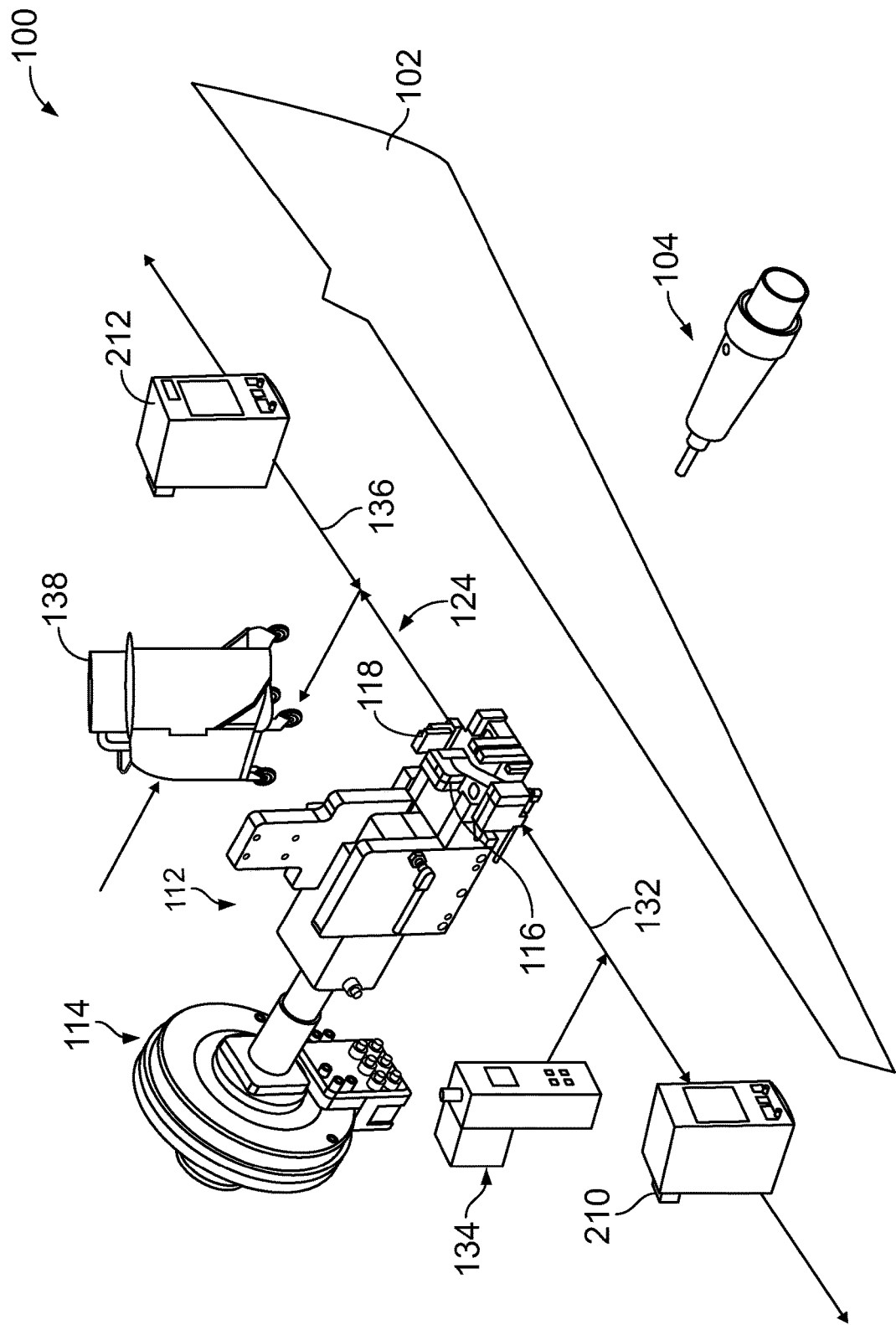
FIG. 6 illustrates a simplified perspective exploded view of a system for removing foreign object debris during a forming operation performed on one or more components by a tool, according to an example of the present disclosure.

FIG. 6 illustrates a simplified perspective exploded view of the system 100 for removing foreign object debris during a forming operation performed on one or more components 102 by the tool 104, according to an example of the present disclosure. As shown, the components 102 cooperate to form a wing panel assembly. The tool 104 is a drill. The fluid circuit 124 includes the first fluid conduit 132 coupled to the pressurized air source 134 and the first portion 116 of the anvil 112, and the second fluid conduit 136 coupled to the vacuum generator 138. A pneumatic gauge 210 can be disposed within the first fluid conduit 132 and configured to measure fluid air pressure within the first fluid conduit 132. Similarly, a vacuum gauge 212 can be disposed within the second fluid conduit 136 and configured to measure vacuum pressure within the second fluid conduit 136.

Figure 7:
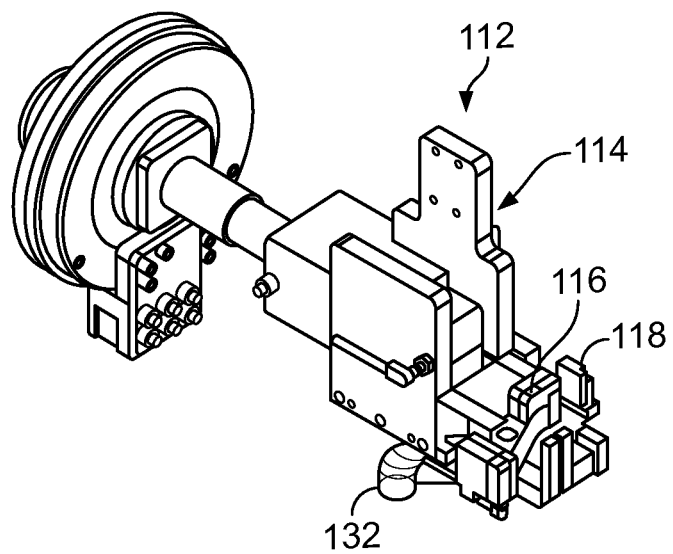
FIG. 7 illustrates a perspective top view of an anvil, according to an example of the present disclosure.

FIG. 7 illustrates a perspective top view of the anvil 112, according to an example of the present disclosure. The first fluid conduit 132 can extend downwardly from the anvil 112 and include one or more portions within the anvil 112. In at least one example, at least a portion of the first fluid conduit 132 passes into the first portion 116, such as the first fork. The first portion 116, such as the first fork, can include at least a portion of the first fluid conduit 132, which provides an internal pressurized air path. Optionally, the first fluid conduit 132 can extend from lateral and/or top portions of the anvil 112.

Figure 8:
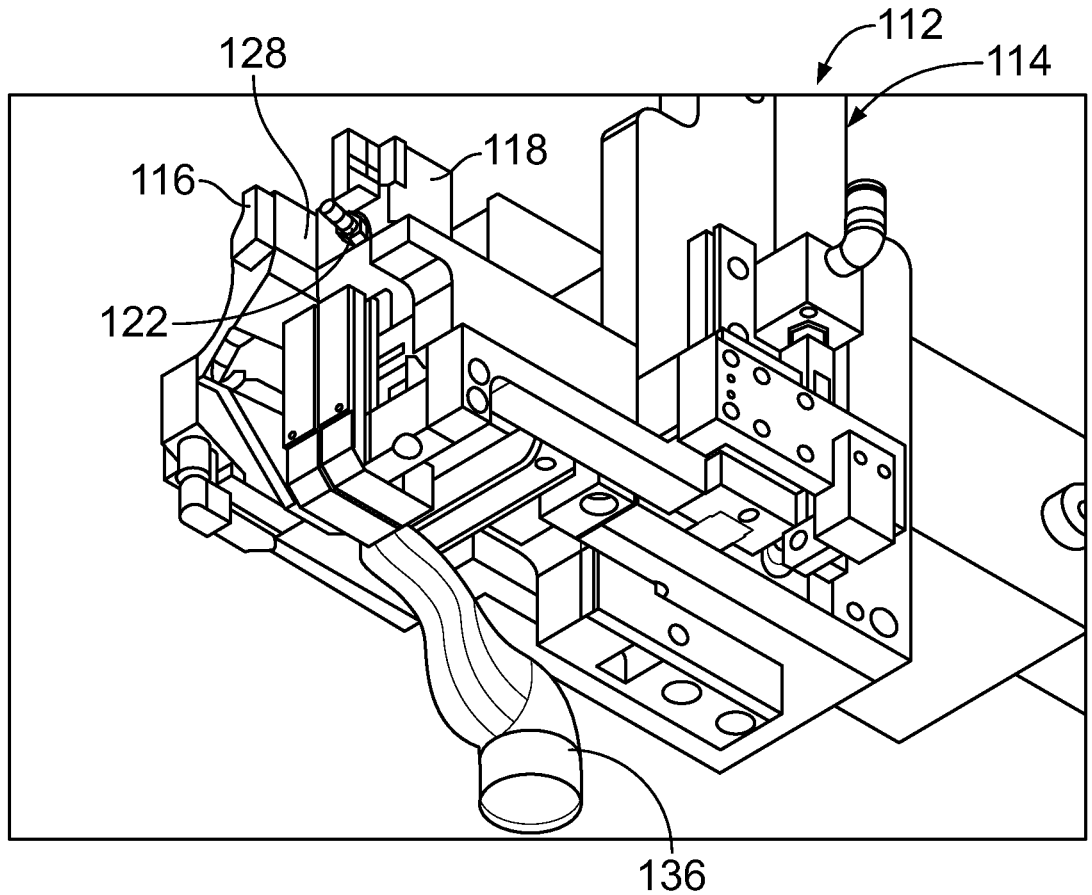
FIG. 8 illustrates a perspective bottom view of an anvil, according to an example of the present disclosure.

FIG. 8 illustrates a perspective bottom view of an anvil 112, according to an example of the present disclosure. The second fluid conduit 136 can extend downwardly from the anvil 112 and include one or more portions within the anvil 112. In at least one example, at least a portion of the second fluid conduit 136 passes into the second portion 118, such as the second fork. The second portion 118, such as the second fork, can include at least a portion of the second fluid conduit 136, which provides an internal vacuum path. Optionally, the second fluid conduit 136 can extend from lateral and/or top portions of the anvil 112.

Referring to FIGS. 2, 7, and 8, the air outlet 128 is formed on and/or within the first portion 116, and is in fluid communication with the first fluid conduit 132. Similarly, the air inlet 130 is formed on and/or within the second portion 118, and is in fluid communication with the second fluid conduit 136. The air outlet 128 is aligned with the air inlet 130. For example, the air outlet 128 and the air inlet 130 can be coaxial. The fluid stream 126 passes through the gap 120 between the air inlet 130 and the air outlet 128, thereby drawing foreign object debris into the air outlet 128. The air outlet 128 can be an outlet end of the first fluid conduit 132, while the air inlet 130 can be an inlet end of the second fluid conduit 136. The first fluid conduit 132 and the second fluid conduit 136 can be metal pipes, chutes, tubes, or the like, such as can be formed via metal laser sintered additive manufacturing.

Figure 9:
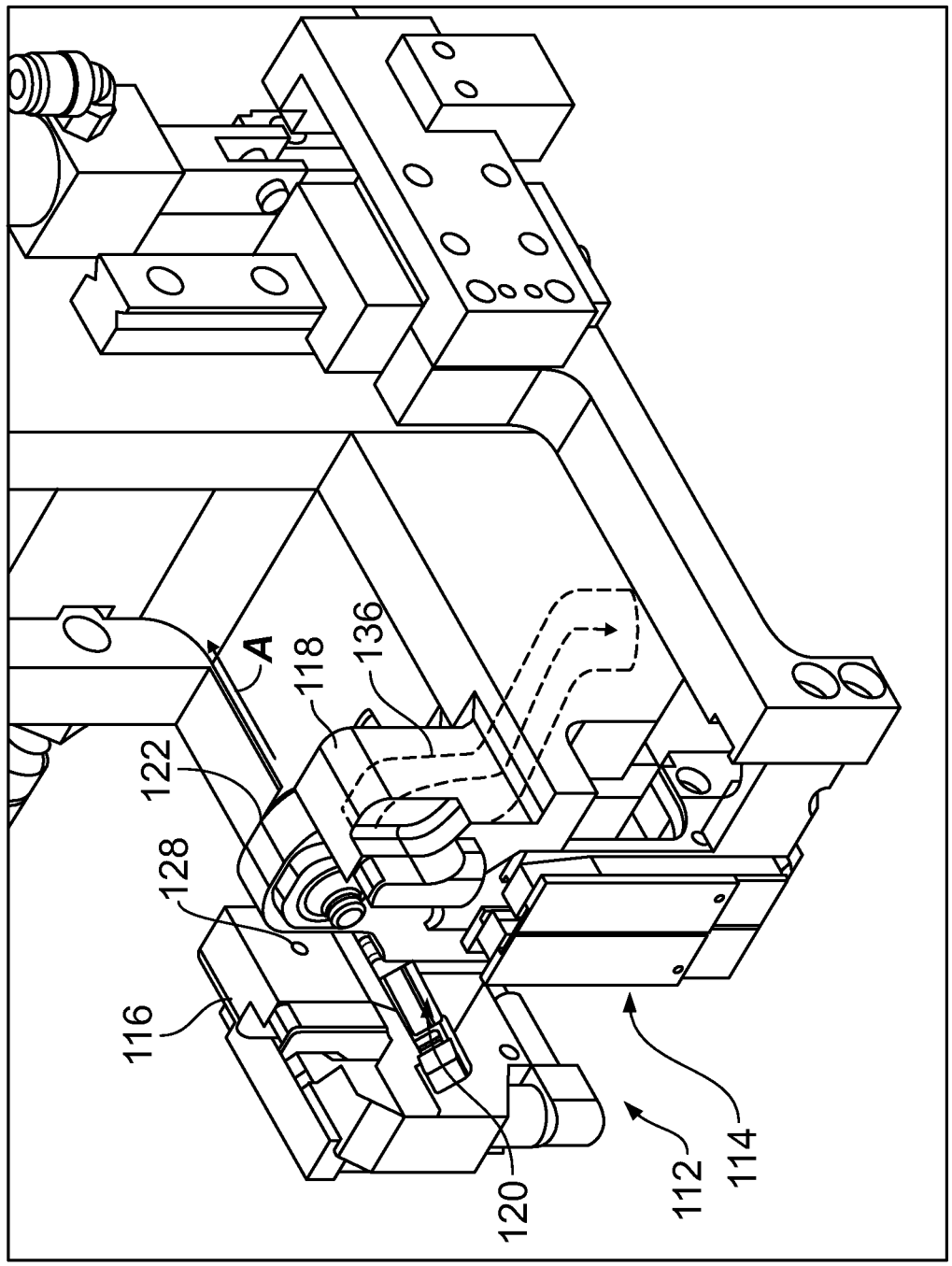
FIG. 9 illustrates a perspective top first view of an anvil, according to an example of the present disclosure.
Figure 10:
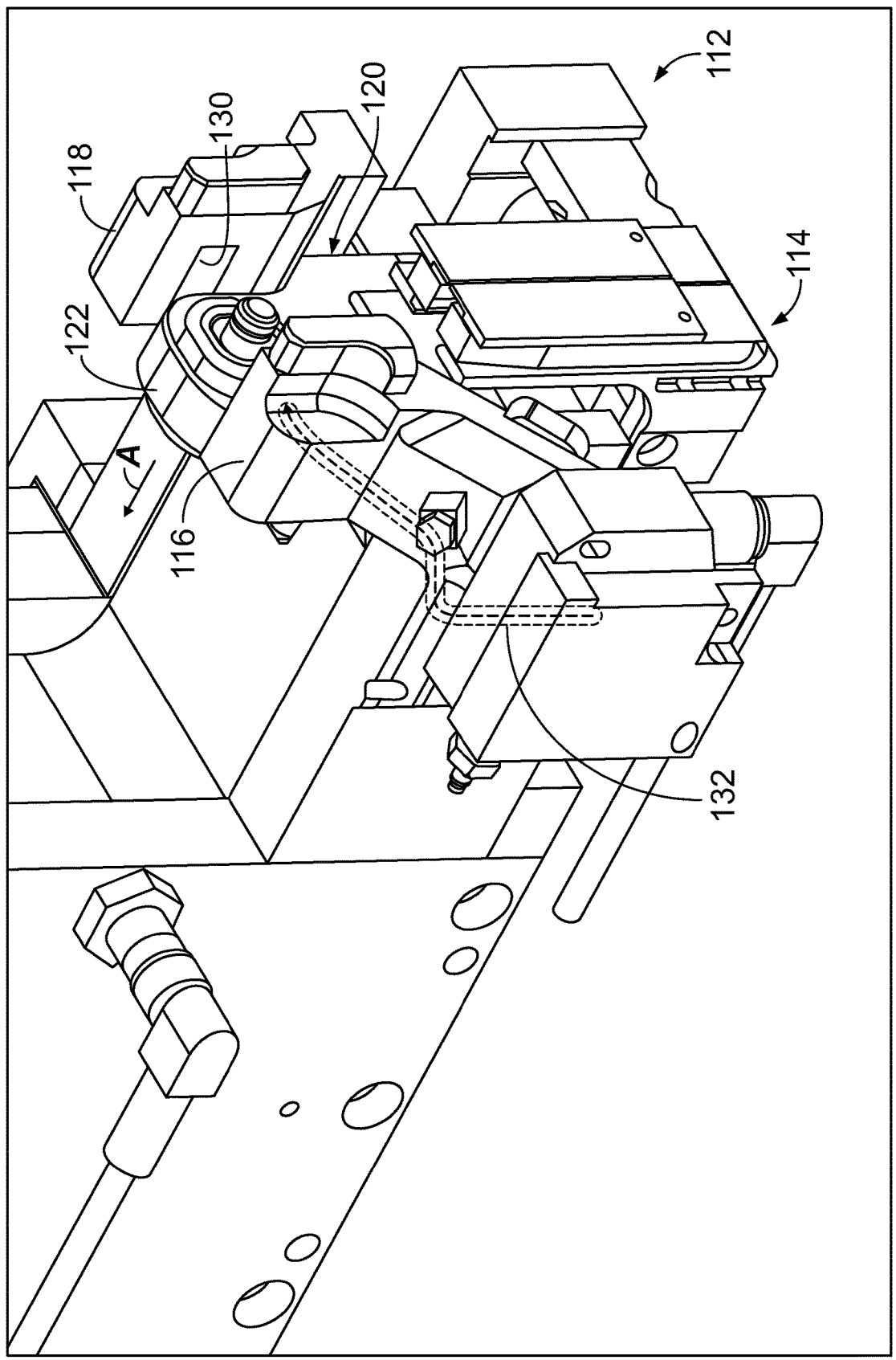
FIG. 10 illustrates a perspective top second view of the anvil of FIG. 9, according to an example of the present disclosure.
Figure 11:
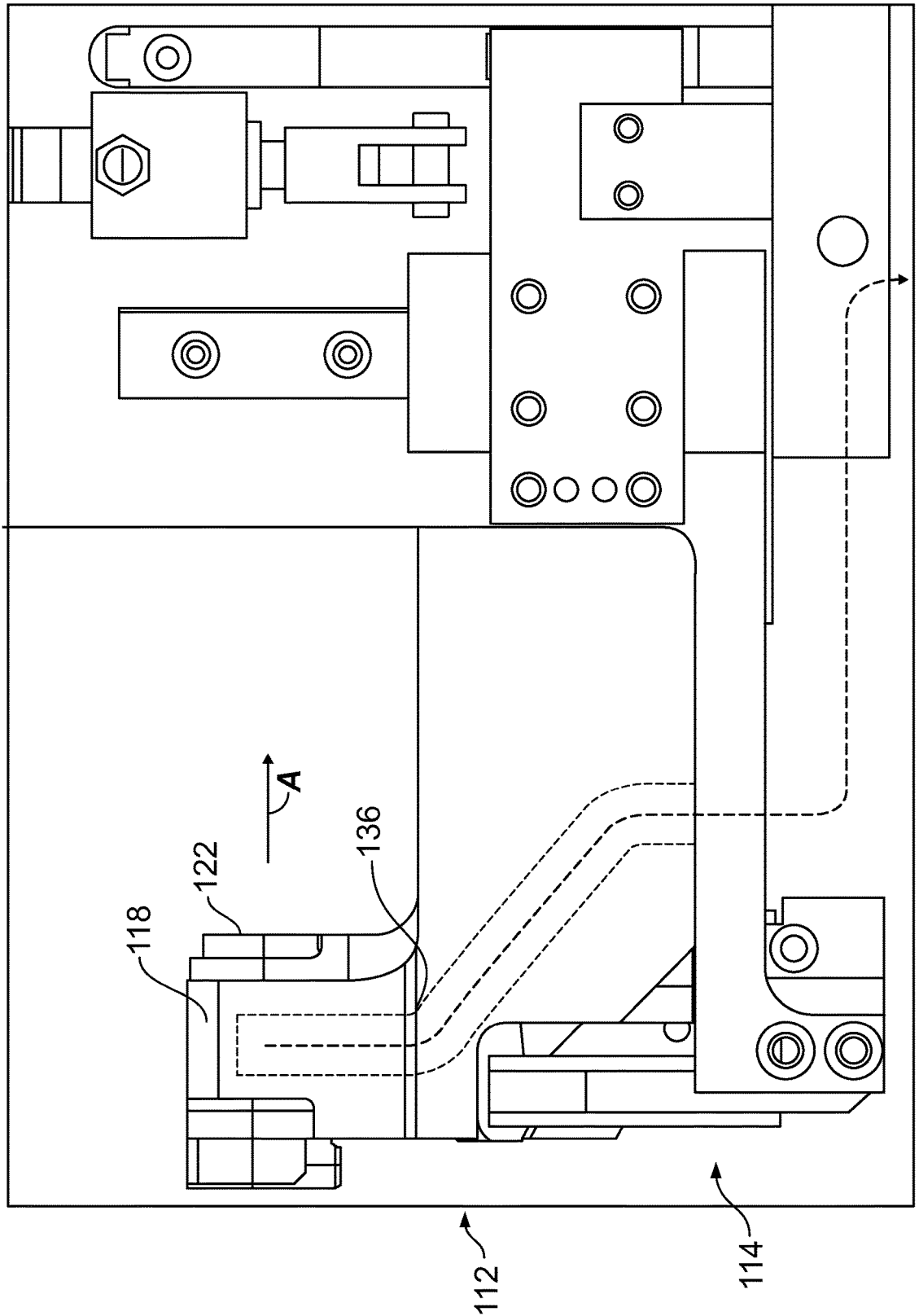
FIG. 11 illustrates a lateral view of the anvil of FIG. 9, according to an example of the present disclosure.
Figure 12:
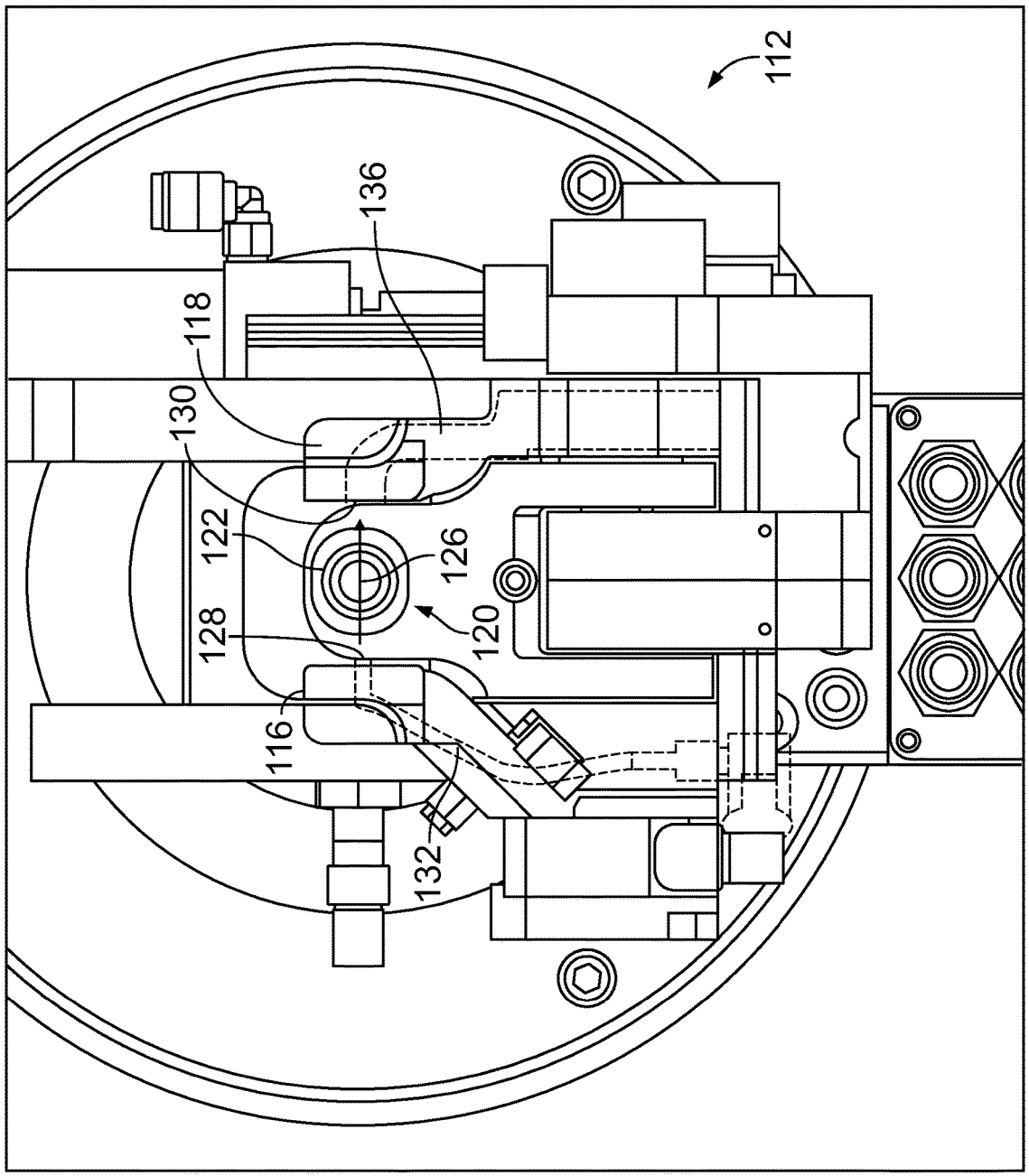
FIG. 12 illustrates an end view of the anvil of FIG. 9, according to an example of the present disclosure.

FIG. 9 illustrates a perspective top view of the anvil 112, according to an example of the present disclosure. FIG. 10 illustrates a perspective top second view of the anvil 112 of FIG. 9. FIG. 11 illustrates a lateral view of the anvil 112 of FIG. 9. FIG. 12 illustrates an end view of the anvil 112 of FIG. 9. Referring to FIGS. 9-12, at least a portion of the second fluid conduit 136 can be integrally formed within the anvil 112, and may extend within and through the second portion 118. Similarly, at least a portion of the first fluid conduit 132 can be integrally formed within the anvil 112, and may extend within and through the first portion 116.

The die 122 is disposed between the first portion 116 and the second portion 118. The die 122 can be moveable within the gap 120. The die 122 can be coaxially aligned with the operative portion 106 of the tool 104 (shown in FIG. 2, for example). The die 122 can be retracted in the direction of arrow A as the tool 104 operates on the component(s) 102, thereby allowing for an unobstructed path for the fluid stream 126 between the fluid outlet 128 and the fluid inlet 130. The fluid stream 126 draws in foreign object debris, which then passes into the fluid inlet 130 and collected away from the component(s) 102 and gap 120.

The portions of the first fluid conduit 132 and the second fluid conduit 136 within the anvil 112 can be sized, shaped, and routed differently than shown in FIGS. 9-12. In at least one other example, the first fluid conduit 132 and the second fluid conduit 136 can be entirely outside of the anvil 112. However, by integrating at least portions of the first fluid conduit 132 and the second fluid conduit 136 within the anvil 112, such as shown in FIGS. 9-12, the form factor of the anvil 112 is not significantly impacted. As such, the anvil 112 can be used in smaller, tighter spaces, for example.

Accordingly, in some aspects, the first and/or second fluid conduits of a fluid circuit can be retrofitted into an existing (for example, manufactured) anvil, such as by adding external structure (such as tubes, chutes, and so forth) that is not provided in the anvil's original configuration, and/or by providing components of an existing anvil with apertures, openings, internal passages, and so forth, to establish a fluid pathway through the anvil.

Figure 13:
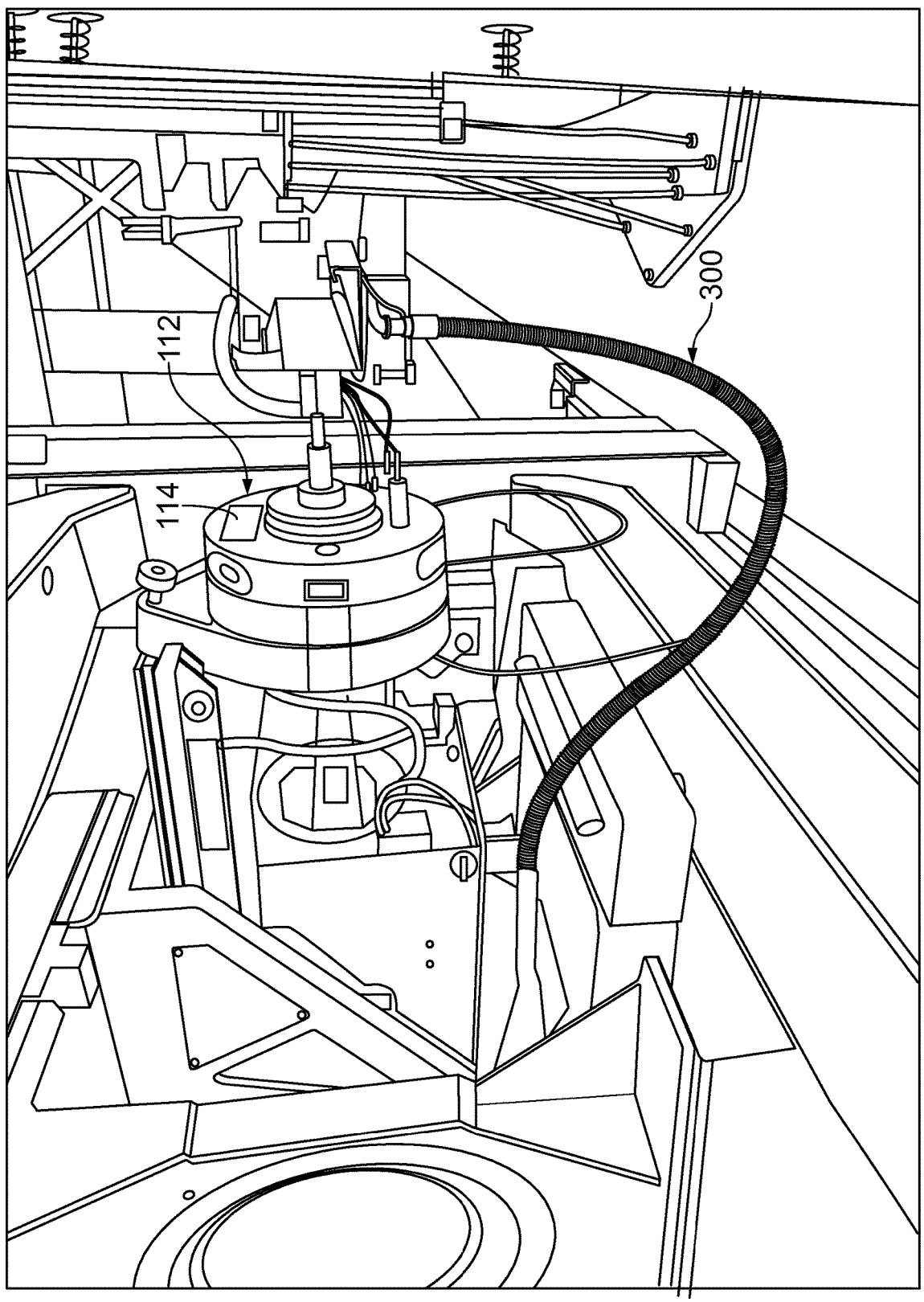
FIG. 13 illustrates a perspective side view of an anvil, according to an example of the present disclosure.

FIG. 13 illustrates a perspective side view of an anvil 112, according to an example of the present disclosure. A tube 300, for example, can contain at least portions of the first fluid conduit 132 and the second fluid conduit 136 that extend outside of the anvil 112.

Figure 14:
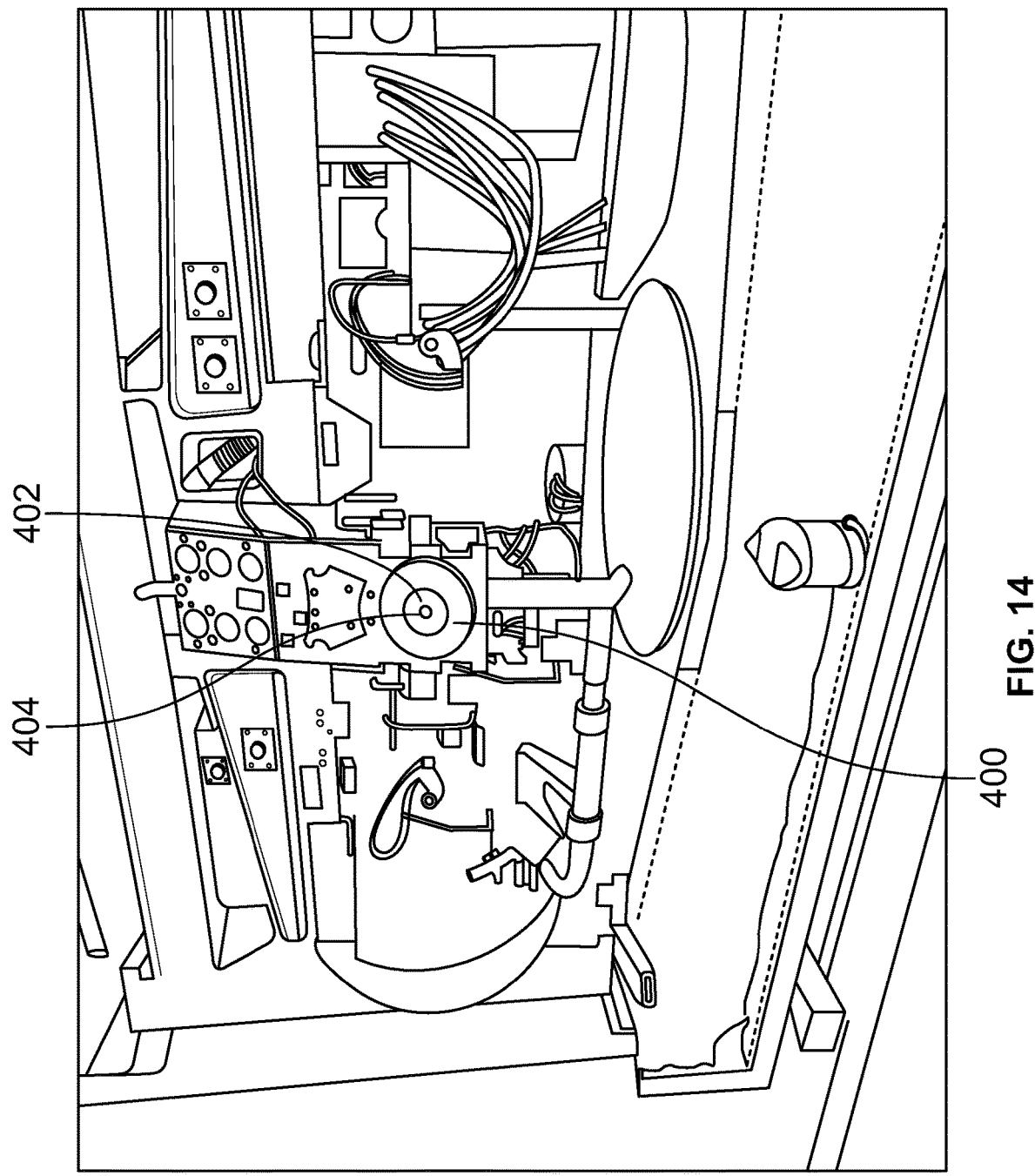
FIG. 14 illustrates a perspective front view of a headstone, according to an example of the present disclosure.

FIG. 14 illustrates a perspective front view of a headstone 400, according to an example of the present disclosure. The headstone 400 provides clamping force in relation to the component(s) 102 during operation of the tool 104 (shown in FIG. 2). For example, the headstone 400 includes a nose piece 402 configured to abut against the first side 108 of the component(s) 102. A passage 404 is formed through the noise piece 402. The operative portion 106 of the tool 104 is configured to pass into passage 404.

Referring to FIGS. 2-14, one or more pneumatic valve(s) can be used to adjust pressure and flow to the air outlet 128 in order to maximize the collection of foreign object debris. The pneumatic valve(s) may receive a control input to open, close, and adjust in addition to a compressed air supply. Similarly, the vacuum generator 138 may receive a control input that can be used to control vacuum force, as desired.

The systems and methods described herein can be used with various other tools other than drilling machines. For example, the systems and methods can be used with sawing devices, laser cutters, and/or the like. The systems and methods can be used with any types of components that can potentially generate foreign object debris when operated upon by a tool. The systems and methods can also be used to collect other types of foreign object debris, such as the tails of tack fasteners.

Further, the disclosure comprises examples according to the following clauses:

Clause 1. A system comprising:
  a tool having an operative portion, wherein the tool is disposed in relation to a first side of one or more components;
  an anvil disposed in relation to a second side of the one or more components, wherein the second side is opposite from the first side, and wherein the anvil comprises a first portion separated from a second portion by a gap; and
  a fluid circuit including a fluid stream that extends through the gap, wherein the fluid circuit is configured to remove foreign object debris generated in relation to the second side of the one or more components.

Clause 2. The system of Clause 1, wherein the fluid circuit comprises one or both of:
  a first fluid conduit in fluid communication with a fluid outlet formed on or within the first portion; or a second fluid conduit in fluid communication with a fluid inlet formed on or within the second portion.

Clause 3. The system of Clause 2, wherein at least a portion of the first fluid conduit is integrally formed within the anvil.

Clause 4. The system of Clauses 2 or 3, wherein at least a portion of the second fluid conduit is integrally formed within the anvil.

Clause 5. The system of any of Clauses 2-4, wherein the fluid circuit comprises both the first fluid conduit and the second fluid conduit.

Clause 6. The system of any of Clauses 2-5, further comprising one or both of:
  a pressurized air source in fluid communication with the first fluid conduit; or a vacuum generator in fluid communication with the second fluid conduit.

Clause 7. The system of Clause 6, comprising both the pressurized air source and the vacuum generator.

Clause 8. The system of any of Clauses 1-7, wherein the one or more components comprises one or more of a panel, a stringer, a skin, or a spar.

Clause 9. The system of any of Clauses 1-8, wherein the tool comprises a drill, a saw, or a laser device.

Clause 10. The system of any of Clauses 1-9, further comprising an additional fluid stream in relation to the first side of the one or more components.

Clause 11. A method comprising:
  removing, by a fluid circuit including a fluid stream that extends through a gap between a first portion and a second portion of an anvil, foreign object debris generated through operation of a tool in relation to one or more components.

Clause 12. The method of Clause 11, wherein the fluid circuit comprises one or both of:
  a first fluid conduit in fluid communication with a fluid outlet formed on or within the first portion; or
  a second fluid conduit in fluid communication with a fluid inlet formed on or within the second portion.

Clause 13. The method of Clause 12, wherein at least a portion of the first fluid conduit is integrally formed within the anvil.

Clause 14. The method of Clauses 12 or 13, wherein at least a portion of the second fluid conduit is integrally formed within the anvil.

Clause 15. The method of any of Clauses 12-14, wherein the fluid circuit comprises both the first fluid conduit and the second fluid conduit.

Clause 16. The method of any of Clauses 12-15, further comprising one or both of:
  a pressurized air source in fluid communication with the first fluid conduit; or
  a vacuum generator in fluid communication with the second fluid conduit.

Clause 17. The method of Clause 16, comprising both the pressurized air source and the vacuum generator.

Clause 18. The method of any of Clauses 11-17, wherein the one or more components comprises one or more of a panel, a stringer, a skin, or a spar.

Clause 19. The method of any of Clauses 11-18, wherein the tool comprises a drill, a saw, or a laser device.

Clause 20. The method of any of Clauses 11-19, further comprising removing additional foreign object debris via an additional fluid stream in relation to the one or more components.

Clause 21. A system comprising:
  a tool having an operative portion, wherein the tool is disposed in relation to a first side of one or more components;
  an anvil disposed in relation to a second side of the one or more components, wherein the second side is opposite from the first side, and wherein the anvil comprises a first portion separated from a second portion by a gap; and
  a fluid circuit including a fluid stream that extends through the gap, wherein the fluid circuit is configured to remove foreign object debris generated in relation to the second side of the one or more components, wherein the fluid circuit comprises:
    a first fluid conduit in fluid communication with a fluid outlet formed on or within the first portion, wherein at least a portion of the first fluid conduit is integrally formed within the anvil; and
    a second fluid conduit in fluid communication with a fluid inlet formed on or within the second portion, wherein at least a portion of the second fluid conduit is integrally formed within the anvil,
    wherein the fluid stream extends between the fluid outlet and the fluid inlet;
  a pressurized air source in fluid communication with the first fluid conduit; and
  a vacuum generator in fluid communication with the second fluid conduit.

Clause 22. An anvil configured to be disposed to a side of one or more components opposite from a tool, the anvil comprising:

a first portion separated from a second portion by a gap; and a fluid circuit including a fluid stream that extends through the gap, wherein the fluid circuit is configured to remove foreign object debris.

Clause 23. The anvil of Clause 22, wherein the fluid circuit comprises one or both of:

a first fluid conduit in fluid communication with a fluid outlet formed on or within the first portion; or a second fluid conduit in fluid communication with a fluid inlet formed on or within the second portion.

Clause 24. The anvil of Clause 23, wherein at least a portion of the first fluid conduit is integrally formed within the anvil.

Clause 25. The anvil of Clauses 23 or 24, wherein at least a portion of the second fluid conduit is integrally formed within the anvil.

Clause 26. The anvil of any of Clauses 23-25, wherein the fluid circuit comprises both the first fluid conduit and the second fluid conduit.

As explained herein, certain examples of the present disclosure provide improved systems and methods for collecting foreign object debris during a manufacturing process. Further, certain examples of the present disclosure provide efficient and effective systems and methods for collecting foreign object debris in relation to a side of one or more components that is opposite from a tool.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   a tool having an operative portion, wherein the tool is configured to be disposed in relation to a first side of one or more components;
   an anvil that is separate and distinct from the tool, wherein the anvil is configured to be disposed in relation to a second side of the one or more components, wherein the second side is opposite from the first side, wherein the anvil comprises a main body, and a first fork separated from a second fork by a gap, and wherein the first fork and the second fork are fixed to the main body; and
   a fluid circuit including an air stream that extends through the gap between the first fork and the second fork, wherein the fluid circuit is configured to remove foreign object debris generated in relation to the second side of the one or more components.

2. The system of claim 1, wherein the first fork comprises a fluid outlet, and the second fork comprises a fluid inlet, the fluid circuit comprises one or both of:
   a first fluid conduit in fluid communication with the fluid outlet formed on or within the first fork; or
   a second fluid conduit in fluid communication with the fluid inlet formed on or within the second fork.

3. The system of claim 2, wherein at least a portion of the first fluid conduit is integrally formed within the anvil.

4. The system of claim 2, wherein at least a portion of the second fluid conduit is integrally formed within the anvil.

5. The system of claim 2, wherein the fluid circuit comprises both the first fluid conduit and the second fluid conduit.

6. The system of claim 2, further comprising one or both of:
   a pressurized air source in fluid communication with the first fluid conduit, wherein the pressurized air source generates the air stream; or
   a vacuum generator in fluid communication with the second fluid conduit.

7. The system of claim 6, comprising both the pressurized air source and the vacuum generator.

8. The system of claim 1, wherein the one or more components comprises one or more of a panel, a stringer, a skin, or a spar.

9. The system of claim 1, wherein the tool comprises a drill, a saw, or a laser device.

10. The system of claim 1, further comprising an additional air stream configured to be in relation to the first side of the one or more components.

11. A method for a system comprising:
a tool having an operative portion, wherein the tool is configured to be disposed in relation to a first side of one or more components;
an anvil that is separate and distinct from the tool, wherein the anvil is configured to be disposed in relation to a second side of the one or more components, wherein the second side is opposite from the first side, wherein the anvil comprises a main body, and a first fork separated from a second fork by a gap, and wherein the first fork and the second fork are fixed to the main body; and
a fluid circuit including an air stream that extends through the gap between the first fork and the second fork, wherein the fluid circuit is configured to remove foreign object debris generated in relation to the second side of the one or more components,
the method comprising:
removing, by the air stream of the fluid circuit, foreign object debris generated through operation of the tool in relation to the one or more components.

12. The method of claim 11, wherein the first fork comprises a fluid outlet, and the second fork comprises a fluid inlet, and wherein the fluid circuit comprises one or both of:
a first fluid conduit in fluid communication with the fluid outlet formed on or within the first fork; or
a second fluid conduit in fluid communication with the fluid inlet formed on or within the second fork.

13. The method of claim 12, wherein at least a portion of the first fluid conduit is integrally formed within the anvil.

14. The method of claim 12, wherein at least a portion of the second fluid conduit is integrally formed within the anvil.

15. The method of claim 12, wherein the fluid circuit comprises both the first fluid conduit and the second fluid conduit.

16. The method of claim 12, wherein the system further comprises one or both of:
a pressurized air source in fluid communication with the first fluid conduit, wherein the pressurized air source generates the air stream; or
a vacuum generator in fluid communication with the second fluid conduit.

17. The method of claim 16, wherein the system further comprises both the pressurized air source and the vacuum generator.

18. The method of claim 11, wherein the one or more components comprises one or more of a panel, a stringer, a skin, or a spar.

19. The method of claim 11, wherein the tool comprises a drill, a saw, or a laser device.

20. The method of claim 11, further comprising removing additional foreign object debris via an additional air stream in relation to the one or more components.

21. A system comprising:
one or more components including a first side and a second side opposite from the first side;
a tool having an operative portion, wherein the tool is disposed in relation to the first side of the one or more components;
an anvil that is separate and distinct from the tool, wherein the anvil is disposed in relation to the second side of the one or more components, and wherein the anvil comprises a main body, and a first fork separated from a second fork by a gap, wherein the first fork and the second fork are fixed to the main body, and wherein the first fork comprises a fluid outlet, and the second fork comprises a fluid inlet; and
a fluid circuit including an air stream that extends through the gap between the first fork and the second fork, wherein the fluid circuit removes foreign object debris generated in relation to the second side of the one or more components, wherein the fluid circuit comprises:
a first fluid conduit in fluid communication with the fluid outlet formed on or within the first fork, wherein at least a portion of the first fluid conduit is integrally formed within the anvil; and
a second fluid conduit in fluid communication with the fluid inlet formed on or within the second fork, wherein at least a portion of the second fluid conduit is integrally formed within the anvil,
wherein the air stream extends between the fluid outlet and the fluid inlet;
a pressurized air source in fluid communication with the first fluid conduit, wherein the pressurized air source generates the air stream; and
a vacuum generator in fluid communication with the second fluid conduit, wherein the vacuum generator receives the air stream and the foreign object debris.

22. An anvil configured to be disposed to a side of one or more components opposite from a tool, wherein the anvil is separate and distinct from the tool, the anvil comprising:
a main body; and
a first fork separated from a second fork by a gap, wherein the first fork and the second fork are fixed to the main body; and
a fluid circuit including an air stream that extends through the gap, wherein the fluid circuit is configured to remove foreign object debris.

23. The anvil of claim 22, wherein the first fork comprises a fluid outlet, and the second fork comprises a fluid inlet, and wherein the fluid circuit comprises one or both of:
a first fluid conduit in fluid communication with the fluid outlet formed on or within the first fork; or
a second fluid conduit in fluid communication with the fluid inlet formed on or within the second fork.

24. The anvil of claim 23, wherein at least a portion of the first fluid conduit is integrally formed within the anvil.

25. The anvil of claim 23, wherein at least a portion of the second fluid conduit is integrally formed within the anvil.

26. The anvil of claim 23, wherein the fluid circuit comprises both the first fluid conduit and the second fluid conduit.

* * * * *